US012152568B2

(12) United States Patent
Talarico (10) Patent No.: US 12,152,568 B2
(45) Date of Patent: Nov. 26, 2024

(54) BIOMECHANICAL ELECTRIC GENERATOR (71) Applicant: David Talarico, Holmdel, NJ (US)

(72) Inventor: David Talarico, Holmdel, NJ (US)

(73) Assignee: David Talarico, Holmdel, NJ (US)

( * ) Notice: Subject to any disclaimer, the term of this patent is extended or adjusted under 35 U.S.C. 154(b) by 895 days.

(21) Appl. No.: 16/495,616

(22) PCT Filed: Mar. 22, 2018

(86) PCT No.: PCT/US2018/023826
§ 371 (c)(1),
(2) Date: Sep. 19, 2019

(87) PCT Pub. No.: WO2018/175762
PCT Pub. Date: Sep. 27, 2018

(65) Prior Publication Data
US 2020/0021216 A1 Jan. 16, 2020

Related U.S. Application Data (60) Provisional application No. 62/474,259, filed on Mar. 21, 2017.

(51) Int. Cl.
F03G 5/00 (2006.01)
F03G 5/06 (2006.01)
H02K 7/18 (2006.01)

(52) U.S. Cl.
CPC ............ F03G 5/063 (2021.08); F03G 5/086 (2021.08); F03G 5/095 (2021.08); F03G 5/103 (2021.08); H02K 7/1807 (2013.01)

(58) Field of Classification Search
CPC ... F03G 5/06; F03G 5/00; F03G 5/063; F03G 5/086; F03G 5/095; F03G 5/103; H02P 9/02; H02K 7/1807; H02J 7/32
USPC .......................................... 290/1 R, 1 E, 1 C
See application file for complete search history.

(56) References Cited

U.S. PATENT DOCUMENTS

| 9,362,803 B2* | 6/2016 | Panousis .................... H02J 7/34 |
| 9,407,125 B2* | 8/2016 | Shepertycky ............. A45F 3/04 |
| 2007/0233279 A1 | 10/2007 | Kazerooni |
| 2008/0277943 A1 | 11/2008 | Donelan |
| 2015/0001853 A1 | 1/2015 | Shepertycky et al. |
| 2015/0207384 A1 | 7/2015 | Panousis |

FOREIGN PATENT DOCUMENTS

CN 106351810 A * 1/2017

OTHER PUBLICATIONS

International Search Report, PCT/US18/23826, Mailed Jun. 20, 2018.

* cited by examiner

Primary Examiner — Julio C. Gonzalez
(74) Attorney, Agent, or Firm — Calderone McKay, LLC (57) ABSTRACT The present invention is able to extract significant amounts of energy from a user who is walking or running while remaining discreetly hidden near an area of the body where many people already carry things (e.g. wallet, smartphone, keys). The user benefits by keeping their device(s) charged for a longer period of time without the need for external batteries. In addition, the present invention encourages an active lifestyle, which has been shown to promote good health and reduce the risk of many diseases.

5 Claims, 8 Drawing Sheets

BIOMECHANICAL ELECTRIC GENERATOR

CROSS-REFERENCE TO RELATED APPLICATIONS

This application claims the benefit of provisional patent application Ser. No. 62/474,259, filed 2017 Mar. 21 by the present inventor.

BACKGROUND—PRIOR ART

The following is a tabulation of some prior art that presently appears relevant:

U. S. Patents

| Pat. No. | Kind Code | Issue Date | Patentee |
| --- | --- | --- | --- |
| 5,358,461 | B2 | 1994 Oct. 25 | Russell M. Bailey, Jr. |
| 6,293,771 | B1 | 2001 Sep. 25 | Thomson Licensing S. A. |
| 7,485,152 | B2 | 2009 Feb. 3 | The Ohio Willow Wood Company |
| 7,652,386 | B2 | 2010 Jan. 26 | Bionic Power Inc. |
| 8,736,087 | B2 | 2014 May 27 | Bionic Power Inc. |
| 9,407,125 | B2 | 2016 Aug. 2 | Queen's University at Kingston |
| US 2006/0046907 | A1 | 2006 Mar. 2 | Jahangir S. Rastegar |
| US 2007/0233279 | A1 | 2007 Oct. 4 | Homayoon Kazerooni |
| US 2008/027802 | A1 | 2008 Nov. 13 | James M. Donelan |

Mobile and wearable devices have become an increasingly vital part of our digitally interconnected world. One of the most frustrating things about these devices is that as performance increases and form factor decreases, battery life suffers. When this technology was in its infancy, having your device run out of battery was usually just an inconvenience, but as millions of people become increasingly dependent on their devices, the fear of losing contact is becoming a major societal issue. In a recent survey, LG showed that 9 out of 10 adults in the US suffer from "low battery anxiety", causing its victims to break healthy habits (such as not going to the gym to instead go home to charge their device) and to put unnecessary strain on their relationships (as their significant other assumes the worst when they cannot reach their loved one).

External battery packs and spare batteries can help to alleviate some of the issue, but they are a burden to carry around and they add to the number of things one needs to remember to keep charged.

A better approach would be to generate electricity directly from the motion of the user. Researcher Klevis Ylli has suggested in the journal "Smart Materials and Structures" that energy can be harvested from the swing of the foot and the impact of the heel. However, the amount of energy from these types of devices is small compared to the needs of a smartphone. In addition, Bionic Power Inc. has created the Powerwalk Kinetic Energy Harvester (U.S. Pat. Nos. 7,652,386 and 8,736,087), which extracts energy from the rotation of the lower leg about the knee. While this device produces more energy, it is bulky and less than ideal for use by the average person during daily life.

A better approach for biomechanical electric generation would be to extract energy from the motion of the upper leg about the hip, as this motion is controlled by the largest muscles in the body. Therefore, a device can extract more energy from these muscles without being noticeable to the user.

The present invention is able to extract significant amounts of energy from the user while remaining discreetly hidden near an area of the body where many people already carry things (e.g. wallet, smartphone, keys). The user benefits by keeping their device(s) charged for a longer period of time without the need for external batteries. In addition, the present invention encourages an active lifestyle, which has been shown to promote good health and reduce the risk of many diseases.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
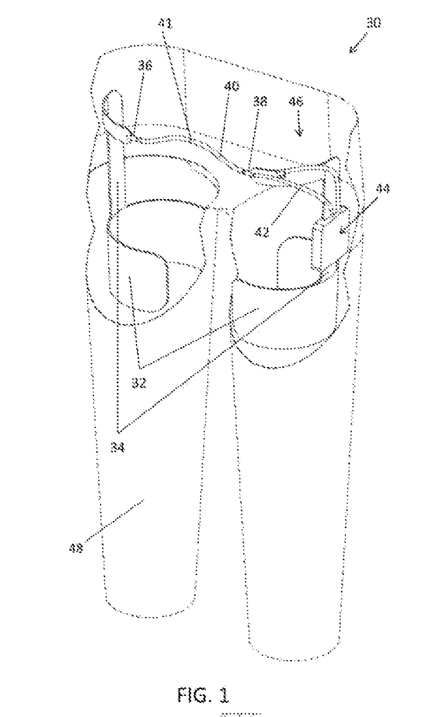
FIG. 1 is a perspective cut-away view of a biomechanical electric generator.
Figure 2:
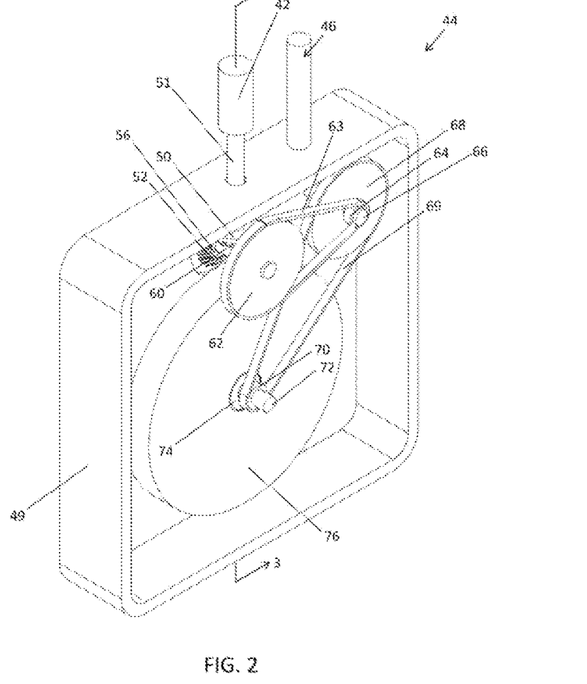
FIG. 2 is a perspective view of a conversion unit with one wall of its housing removed.
Figure 3:
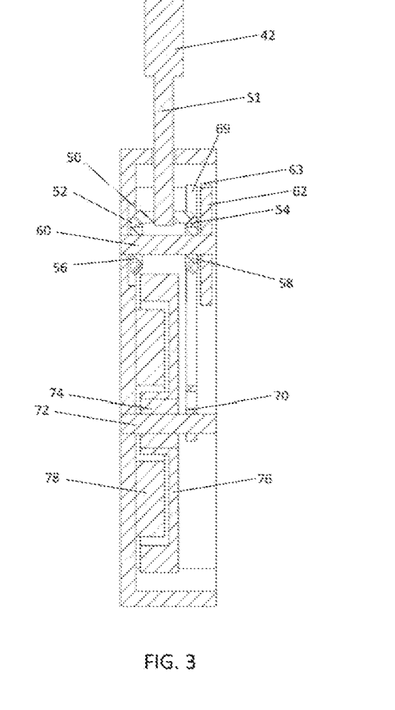
FIG. 3 is a cross section view of a conversion unit with one wall of its housing removed.

FIG. 1, FIG. 2 and FIG. 3—An Embodiment of a Biomechanical Electric Generator One embodiment of a biomechanical electric generator, generally designated 30, is illustrated in FIG. 1, FIG. 2, and FIG. 3. In one embodiment, generator 30 comprises leg cuffs 32, crank arms 34, an end mount 36, a middle bearing 38, a middle bi-directional flexible shaft 40, an end bi-directional flexible shaft 42, a conversion unit 44, and an electric cable 46. Legwear 48 is shown in FIG. 1 for demonstrative purposes. In one embodiment, generator 30 is for use with a human being. In other embodiments, generator 30 is for use with any suitable animal with limbs (e.g. a dog, a horse, a camel, a cow, an ox, and the like).

FIG. 1 shows a cut-away view, in which a portion of legwear 48 has been removed to reveal an embodiment of generator 30. In one embodiment, generator 30 is fully covered by legwear 48. In another embodiment, generator 30 is only partially covered by legwear 48. In one embodiment, generator 30 can be used without legwear 48. In one embodiment, generator 30 is fully lined by a liner (not shown) on the inside. In one embodiment, the liner is affixed (e.g. bonded, crimped, stapled, sewn, using fabric snaps, zippered, using hook and loop fasteners, and the like) to legwear 48, forming a fabric enclosure around generator 30. In one embodiment, the liner is comprised of flocking which is affixed to the inner surfaces of generator 30. In some embodiments, all or part of the liner is made of elastic fibers such as Spandex. Lyrcra, and the like. In some embodiments, all or part of generator 30 is removable from legwear 48 by utilizing a suitable fastener (not shown) (e.g. fabric snaps, Velcro, magnets, zippers, and the like).

Leg cuffs 32 contact the user's legs such that they oppose the legs during locomotion. Leg cuffs 32 should cover enough of the user's legs to comfortably transmit forces from their legs to generator 30. Crank arms 34 are affixed at one end to leg cuffs 32 and extend upward toward the user's waist to transmit the user's legs' motion to shaft 42. In one embodiment, leg cuffs 32 are made of formed CPVC, but in other embodiments they are made of aluminum, fabric covered aluminum, fabric covered CPVC, a suitably strong plastic, fiberglass, composite, metal, fabric/cushioned covered plastic, fabric/cushioned covered metal, and the like. In other embodiments, leg cuffs 32 are entirely made of a closed loop of fabric. In some embodiments, leg cuffs 32 include adjustable straps (not shown) to adjust the fit to the user. In still other embodiments, all or part of leg cuffs 32 are made of elastic fibers such as spandex, Lycra, and the like. In still other embodiments, all or part of leg cuffs 32 are made of a closed loop of elastic material such as rubber, latex, silicone, spring steel, polyurethane, and the like, in order to automatically adjust to the user's leg size.

In one embodiment, crank arms 34 are made of formed CPVC. In other embodiments, crank arms 34 are made of another suitably durable rigid material such as aluminum, steel, hard plastic, fiberglass, composite, and the like. In one embodiment, leg cuffs 32 are made of fabric and comprise sleeves into which crank arms 34 are permanently affixed. In another embodiment, leg cuffs 32 are made of fabric and comprise sleeves into which crank arms 34 are slidably removable. In another embodiment, leg cuffs 32 are made of fabric and comprise sleeves into which crank arms 34 are slidably removable and provide a gripping force (e.g. by an interference fit, a rubberized surface, and the like). It should be understood that the geometry of crank arms 34 is exemplary, and that they could comprise any suitable geometry which extends from leg cuffs 32 to mounting points for mount 36 and bearing 38 which are substantially close to the axis of rotation of the leg during normal walking or running. In one embodiment, mount 36 and bearing 38 are attached directly to leg cuffs 32, avoiding the need for crank arms 34. In one embodiment, crank arms 34 comprise circular cross sections. In another embodiment, crank arms 34 comprise rectangular cross sections. In still another embodiment, crank arms 34 are removably attached directly to legwear 48, eliminating the need for leg cuffs 32. In still another embodiment, crank arms 34 are affixed directly to legwear 48, eliminating the need for leg cuffs 32.

Shaft 40 is rigidly coupled (e.g. using a set screw, by interference fit, using adhesive, using a clamp, or the like) to mount 36 on one end and rotatably mounted to bearing 38 on its other end. Mount 36 and bearing 38 are in turn rigidly coupled to crank arms 34. Therefore, crank arms 34 allow the relative rotary motion of the user's legs to be transmitted to shaft 40.

In one embodiment, shafts 40 and 42 are bi-directional flexible shafts which can transmit toque in both rotational directions and are covered to prevent abrasion to the surrounding fabrics and/or to the user's skin. In one embodiment, shaft 40 is routed through a sleeve (not shown) in legwear 48 in a suitable path to make shaft 40 less noticeable to the user. In one embodiment, mount 36 comprises a torque-limiting mechanism, which allows shaft 40 to rotate if the torque applied to mount 36 becomes too high in order to prevent damage to any part of generator 30. In one embodiment, the torque limiting mechanism in mount 36 drops the torque applied to shaft 40 to zero when activated. In another embodiment, the torque limiting mechanism in mount 36 maintains a substantially constant torque applied to shaft 40 when activated, in order to make the mechanism less noticeable to the user. In one embodiment, shaft 40 is routed around the front of the user and a coupling 41 allows the user to easily separate and reattach shaft 40 near its midpoint, thereby allowing the user to easily put on or take off legwear 48.

Shaft 42 is rigidly coupled to shaft 40 in or near bearing 38 on one end and enters unit 44 on its other end. Shaft 42 thusly transmits the rotational motion of shaft 40 to unit 44. Unit 44 converts the motion of shaft 42 into electricity, which is fed through cable 46 when cable 46 is electrically connected to an electronic device (not shown). In one embodiment, cable 46 is fed through a reinforced hole (not shown) in a pocket (not shown) in legwear 48. In one embodiment, cable 46 is fed through a sleeve (not shown) in legwear 48 such that it is routed to a suitably convenient location.

In one embodiment, unit 44 is rigidly coupled to the crank arm 34 that is rigidly coupled to bearing 38. In one embodiment, which does not contain crank arms 34, unit 44 is rigidly coupled to the leg cuff 32 that is rigidly coupled to bearing 38. In one embodiment, unit 44 is removably mounted to the crank arm 34 that is rigidly coupled to bearing 38. In one embodiment, which does not contain crank arms 34, unit 44 is removably mounted to the leg cuff 32 that is rigidly coupled to bearing 38. In one embodiment, unit 44 is permanently mounted to legwear 48. In another embodiment, unit 44 is removably mounted to legwear 48. In one embodiment, the removable mounting (not shown) of unit 44 comprises temporary mechanical fastener(s) (e.g. fabric snaps, a fabric pouch, Velcro, zippers, one or more sliding interlocks, quick-release pins, and the like), in other embodiments, it comprises magnetic fasteners.

FIG. 2 and FIG. 3—An Embodiment of a Conversion Unit

In one embodiment, shown in FIG. 2 and FIG. 3, unit 44 comprises a housing 49, an input bevel gear 50, an input shaft 51, bevel gear 52, bevel gear 54, one way locking clutch 56, one way locking clutch 58, shaft 60, pulley 62, belt 63, pulley 64, shaft 66, pulley 68, belt 69, pulley 70, shaft 72, one way locking clutch 74, rotor 76, and stator 78. One wall of housing 49 has been removed to reveal the internal components of unit 44.

In one embodiment, housing 49 is made of Delrin plastic. In other embodiments, housing 49 is made of another suitably rigid and durable material such as aluminum, steel, fiberglass, composite, HDPE, ABS, other metals, other plastics, and the like. Shafts 51, 60, 66, and 72 are rotatably mounted to housing 49.

In one embodiment, shaft 51 is rigidly coupled to shaft 42 on one end, and to gear 50 on its other end. In other embodiments, shaft 51 is removably coupled to shaft 42 using suitable mean (e.g. mating male and female spline ends, mating male and female square ends, mating male and female hex ends, mating male and female circular ends with cross drilled holes and a telescoping spring pin, and the like). Gear 50 meshes with gears 52 and 54 which are, in turn, rigidly coupled to clutches 56 and 58, respectively. Clutches 56 and 58 are mounted on shaft 60 such that they both engage in the same direction, and both spin freely in the opposite direction. Thus, the arrangement of gears 50, 52, 54, and clutches 56 and 58 convert the oscillatory rotation of input shaft 51 into the one way rotation of shaft 60. This arrangement is exemplary, and it should be understood that any suitable two way to one way rotation converter (e.g. using spur gears, using a compound planetary gear set, and the like) may be employed.

Shaft 60 is rigidly coupled to pulley 62, which is in turn driving belt 63. Belt 63 drives a smaller diameter pulley 64, which is in turn rigidly coupled to shaft 66. Shaft 66 is rigidly coupled to pulley 68, which in turn drives belt 69. Belt 69 drives smaller pulley 70, which is in turn rigidly coupled to shaft 72. Thus, pulleys 62, 64, 68, and 70, shaft 66, and belts 63 and 69 substantially increase the angular speed of shaft 72 relative to shaft 60. This arrangement is exemplary, and it should be understood that in other embodiments, other suitable speed increasing mechanisms (e.g. a planetary gear set, a compound planetary gear set, a compound gear set, a harmonic drive gear set, and the like) are employed.

Clutch 74 is mounted to shaft 72 such that it only engages when driven by shaft 72. Clutch 74 is rigidly coupled to rotor 76. Stator 78 is rigidly coupled to housing 49. Rotor 76 and stator 78 are electromagnetically coupled and convert the mechanical energy provided by rotor 76 into electrical energy in the coils (not shown) of stator 78, thereby comprising an electric generator 80. Rotor 76 should be designed to have a high enough moment of inertia such that it can maintain a suitable rotational speed for efficient electrical conversion during changes in rotational direction of input shaft 51 during normal operation.

Electric generator 80 is electrically connected to cable 46. In one embodiment, shown in FIG. 1, cable 46 comprises an insulated electrical conductor 82, an enclosed electric circuit 84, and an electrical connector 86. It should be understood that this geometric configuration of the components of cable 46 is exemplary. For example, in one embodiment, cable 46 exists entirely within housing 49, where electrical connector 86 is a panel-mounted female connector which is rigidly coupled to housing 49 to provide an electrical socket in unit 44 to the user. In one embodiment connector 86 is of USB type. In another embodiment, generator 30 also includes multiple adapters (not shown) which can be connected to connector 86 to allow generator 30 to be compatible with a plurality of electronic devices. In one embodiment, circuit 84 is in line with conductor 82. In another embodiment, circuit 84 is within unit 44. In one embodiment, circuit 84 includes a heat sink (not shown) to prevent circuit 84 from overheating.

In one embodiment, connector 86 is a magnetic connector with a mating magnetic adapter (not shown) which the user inserts into their electronic device such that connector 86 is more easily put into electrical connection with the user's device. In one embodiment, a magnetic connector 86 is rigidly coupled to a device dock (not shown) at the base of a pocket in legwear 48 such that the user only needs to insert their device into their pocket in the correct orientation for connector 86 to automatically connect itself to the device.

In one embodiment, cable 46 is routed through a user's clothing (not shown) to provide electricity to a device within a bag (not shown) such as a backpack, a handbag, a laptop bag, or the like. In one embodiment, electrical contacts (not shown) in a user's clothing (not shown) (e.g. near the shoulders of a shirt or jacket) and mating electrical contacts (not shown) on a bag (not shown) (e.g. on an inner surface of the bag's strap(s)) allow cable 46 to be in electrical connection with the bag without the need for the user to plug connector 86 into the bag, where the bag has internal wiring (not shown) to electrically connect cable 46 to a device within the bag.

In one embodiment, cable 46 is routed through a user's clothing (not shown) to provide electricity to wearable technology (not shown) such as a smart watch, a fitness tracker, a Bluetooth headset, headgear, smart glasses, a medical device, a health monitoring device, or the like. In one embodiment, the user's clothing has embedded wires (not shown) and strategically placed conductive fabric to automatically connect to a device (not shown) when the device is worn with the clothing.

In one embodiment, cable 46 is connected to temperature controlled clothing (not shown).

In one embodiment, electric generator 80 is a 3 phase 12 pole permanent magnet brushless generator and circuit 84 is a 3 phase rectified 5 VDC power supply circuit (e.g. comprising a 3 phase rectifier, a smoothing capacitor, and an L7805 voltage regulator). In another embodiment, electric generator 80 is a brushed dc generator and circuit 84 is a 5 VDC power supply circuit (e.g. comprising a smoothing capacitor and an L7805 voltage regulator). In another embodiment, electric generator 80 is an alternator and circuit 84 is an alternator circuit. In one embodiment, circuit 84 includes one or more diodes to prevent the user's device's battery from draining when the device is connected to cable 46 and generator 80 is not energized (e.g. when the user is standing still or moving too slowly).

Figure 4:
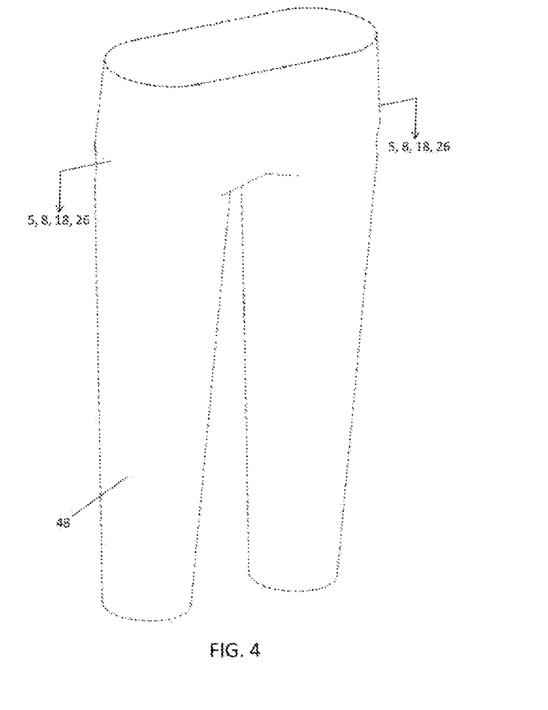
FIG. 4 is a perspective view of legwear.
Figure 5:
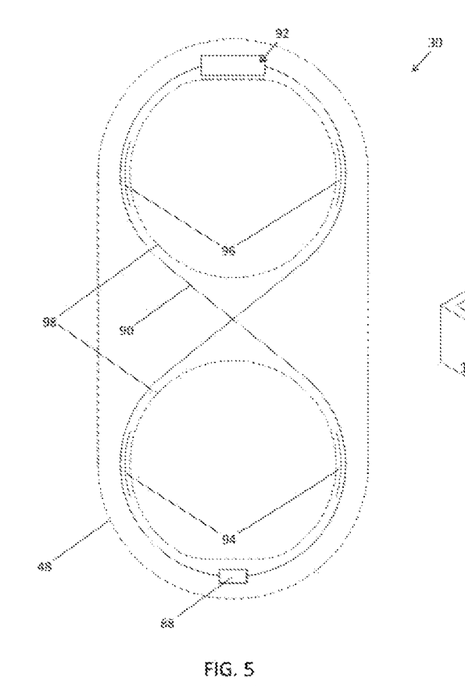
FIG. 5 is a cross section diagram of a biomechanical electric generator.

FIG. 4 and FIG. 5—An Embodiment of a Biomechanical Electric Generator

FIG. 4 illustrates legwear 48 and the cross section planes for FIG. 5, FIG. 8, FIG. 18, and FIG. 26.

In one embodiment, shown in FIG. 5, generator 30 comprises an attachment clamp 88, a flexible tension member 90, a conversion unit 92, cable 46 (FIG. 1), and leg cuffs 94 and 96. User legs 98 and legwear 48 are shown for demonstrational purposes.

In one embodiment, member 90 is affixed to legwear 48 using clamp 88. In another embodiment, member 90 is affixed to a u-shaped leg cuff (not shown) using clamp 88. In one embodiment, clamp 88 is attached to legwear 48 near the sideseam of a first leg 98 that is opposite unit 92. Unit 92 is affixed to legwear 48 near the sideseam of a second leg 98 that is opposite clamp 88. Member 90 is routed around leg cuffs 94 and 96 and through unit 92 in a figure-eight path around legs 98. In one embodiment, member 90 is covered near leg cuffs 94 and 96 to reduce friction and protect the user. In one embodiment, leg cuffs 94 and 96 are affixed to legwear 48 outside of the plane of the cross section in FIG. 5. In one embodiment, leg cuffs extend further circumferentially about legs 98 than those shown in FIG. 5.

In one embodiment, leg cuffs 94 and 96 are made of formed CPVC, but in other embodiments they are made of aluminum, fabric covered aluminum, fabric covered CPVC, a suitably strong plastic, fiberglass, composite, metal, fabric/cushioned covered plastic, fabric/cushioned covered metal, and the like.

In one embodiment, member 90 is a flat urethane belt. In other embodiments, member 90 is another suitably strong and durable flexible tensile member such as a ribbed belt, a steel cable, a coated steel cable, a v belt, a monofilament line, a fluorocarbon line, a nylon rope, a circular belt, and the like. In one embodiment, member 90 is a push-pull cable that can act in tension and compression.

Figure 6:
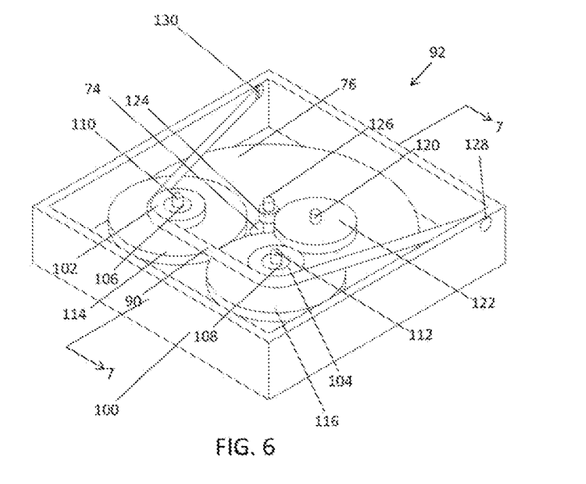
FIG. 6 is a perspective view of a conversion unit one wall of its housing removed.
Figure 7:
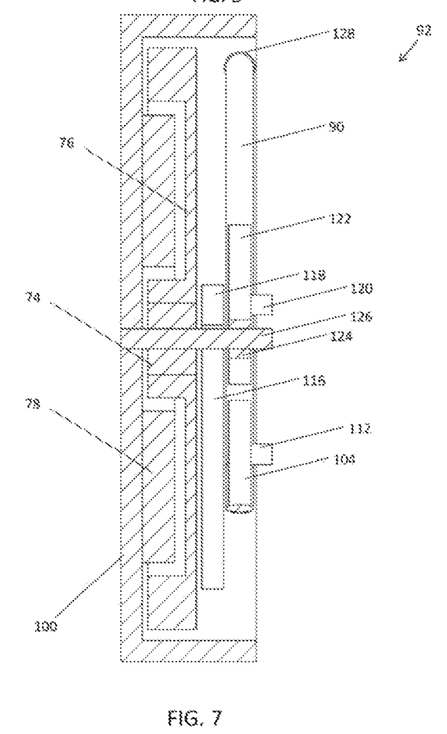
FIG. 7 is a cross section view of a conversion unit one wall of its housing removed.

FIG. 6 and FIG. 7—An Embodiment of a Conversion Unit

In one embodiment, shown in FIG. 6 and FIG. 7, unit 92 comprises a housing 100, pulleys 102 and 104, one way locking clutches 106 and 108, shafts 110 and 112, gears 114 and 116, a small gear 118, a shaft 120, a gear 122, a small gear 124, a shaft 126, a one way locking clutch 74, a rotor 76, and a stator 78. One side of housing 100 has been removed to reveal the inner features of unit 92. Shafts 110, 112, 120, and 126 are rotatably mounted to housing 100.

Member 90 enters unit 92 through openings 128 and 130 in housing 100 and is routed around pulleys 102 and 104, such that any movement of member 90 through unit 92 causes pulleys 102 and 104 to rotate in the same rotational direction. In one embodiment, openings 128 and 130 are sufficiently smooth such that the friction acting on member 90 remains sufficiently low. In another embodiment, additional guide rollers (not shown) align member 90 with pulleys 102 and 104 to reduce friction.

Pulleys 102 and 104 are rigidly coupled to clutches 106 and 108. Clutch 106 engages shaft 110 when rotated in a first rotational direction, while clutch 108 engages shaft 112 when rotated in a second rotational direction which is opposite the first. Gears 114 and 116 are in mesh and rigidly coupled to shafts 110 and 112, respectively. Therefore, any movement of member 90 through unit 92 causes either clutch 106 or 108 to engage, and gears 114 and 116 will always rotate in the same rotational direction. It should be understood that this oscillatory rotation to one way rotation is exemplary, and that in other embodiments one way rotation may be achieved through another two way to one way rotation means.

Gear 116 is also in mesh with gear 118 which is, in turn, rigidly coupled to shaft 120. Shaft 120 is rigidly coupled to gear 122 which is, in turn, in mesh with gear 124. Thus, gears 116, 118, 122, and 124 and shaft 120 substantially increase the angular speed of gear 124 relative to gear 116. This arrangement is exemplary, and it should be understood that in other embodiments, other suitable speed increasing mechanisms (e.g. a planetary gear set, a compound planetary gear set, a belt drive, a harmonic drive gear set, and the like) are employed.

Gear 124 is rigidly coupled to shaft 126 which, in turn, engages with clutch 74 when shaft 126 is driven by gear 124. Clutch 74, rotor 76, stator 78, and cable 46 (FIG. 1) each function identically to those in FIG. 2 and FIG. 3.

Figure 8:
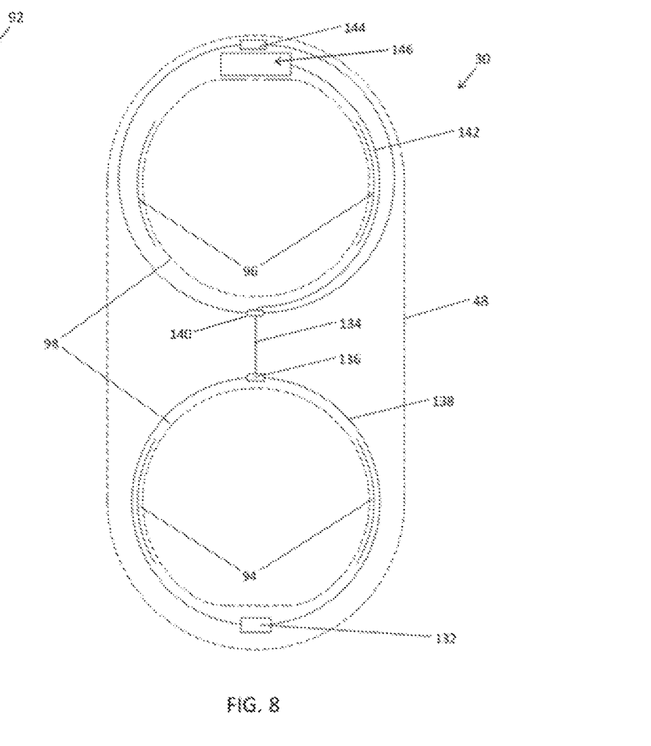
FIG. 8 is a cross section diagram of a biomechanical electric generator.

FIG. 8—An Embodiment of a Biomechanical Electric Generator

In one embodiment, shown in FIG. 8, generator 30 comprises an attachment clamp 132, a flexible tension member 134, an attachment clamp 136, a flexible tension member 138, a ring 140, a flexible tension member 142, an attachment clamp 144, a conversion unit 146, a cable 46 (FIG. 1), and leg cuffs 94 and 96. User legs 98 and legwear 48 are shown for demonstrational purposes. Leg cuffs 94 and 96 should cover enough of legs 98 to comfortably transmit forces from legs 98 to generator 30.

In one embodiment, members 134, 138, and 142 are made of fluorocarbon line. In other embodiments, members 134, 138, and 142 are made of another suitably strong and durable flexible tensile member such as a steel cable, a coated steel cable, a monofilament line, a fluorocarbon line, a nylon rope, and the like.

In one embodiment, members 138 and 142 are affixed to legwear 48 near the sideseams of legwear 48 using clamps 132 and 144, respectively. In one embodiment, unit 146 is affixed to legwear 48 near clamp 132. Member 138 is affixed to one end of member 134 using clamp 136 in between legs 98. Member 142 is affixed to the outer surface of ring 140 in between legs 98. Member 134 is routed through ring 140, around leg cuff 94, and into unit 146. In one embodiment, members 134, 138, and 142 are covered near leg cuffs 94 and 96 to reduce friction and protect the user.

Figure 9:
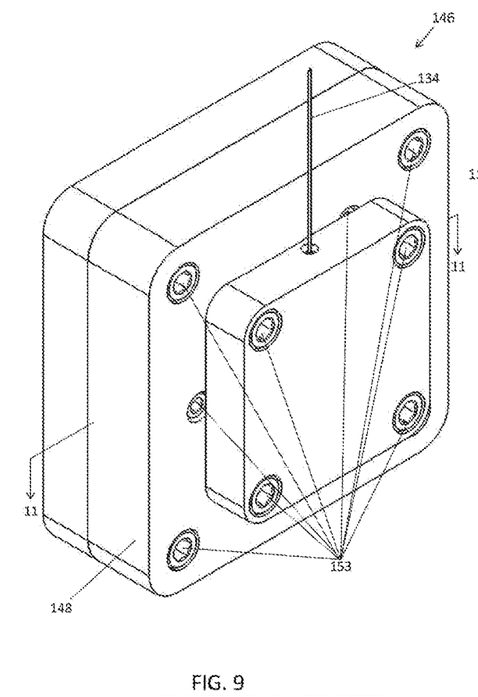
FIG. 9 is a perspective view of a conversion unit.
Figure 10:
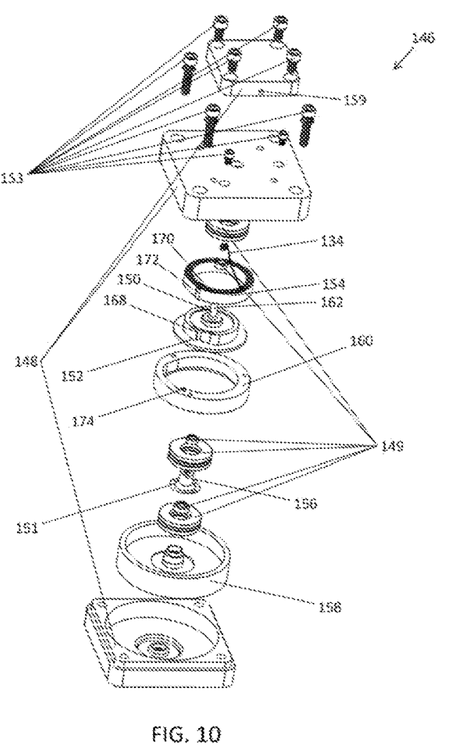
FIG. 10 is an exploded view of a conversion unit.
Figure 11:
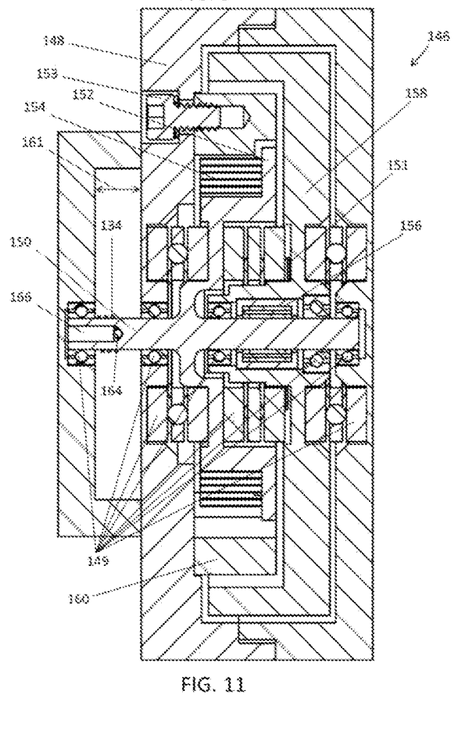
FIG. 11 is a cross section view of a conversion unit.

FIG. 9, FIG. 10, and FIG. 11—An Embodiment of a Conversion Unit

In one embodiment, shown in FIG. 9, FIG. 10, and FIG. 11, unit 146 comprises a housing 148, bearings 149, a shaft 150, a wave spring 151, a recoil disc 152, fasteners 153, a recoil spring 154, a one way locking clutch 156, a rotor 158, and a stator 160. Bearings 149 rotatably support shaft 150, recoil disc 152, and rotor 158 in housing 148. Wave spring 151 helps reduce vibrations in unit 146. Fasteners 153 hold housing 148 together and rigidly couple stator 160 to housing 148.

In one embodiment, member 134 enters unit 146 through a hole 159 (FIG. 10) in housing 148, is wrapped around shaft 150, and enters through a cross drilled blind hole 162 (FIG. 10) in shaft 150. A knot 164 (FIG. 11) in member 134 sits in a blind hole 166 (FIG. 11) in shaft 150 and prevents member 134 from detaching from shaft 150. In other embodiments, member 134 is affixed to shaft 150 by another means (e.g. bonded, tied, clamped, and the like). Shaft 150 should have a diameter small enough where member 134 wraps around it to provide adequate rotational speed to rotor 158, while remaining large enough to maintain its structural integrity. A gap 161 in housing 148 should be large enough to accommodate member 134 when shaft 150 is fully recoiled. In one embodiment, member 134 is a push-pull cable that can act in tension and compression.

Shaft 150 is rigidly coupled to recoil disc 152. A hook 168 (FIG. 10) in recoil disc 152 mates with a corresponding hook 170 (FIG. 10) at the inner end of spring 154. The outer end of spring 154 includes a hook 172 (FIG. 10) that mates with a corresponding hook 174 (FIG. 10) on the inner surface of stator 160. Thus, recoil spring 154 tends to keep member 134 wound a suitable amount around shaft 150. The torque applied by spring 154 should be large enough to wind member 134 about shaft 150 in a sufficiently short amount of time (e.g. a sufficiently small fraction of the time it takes for the user to take one step), but small enough that it does not add significantly noticeable resistance to the user. In the same regard, mass moment of inertia taken about the axis of shaft 150 of all the components that recoil should be as small as possible (to reduce recoil time and/or to decrease the necessary spring torque) while maintaining suitable structural integrity of these components.

Clutch 156 is rigidly coupled to rotor 158. Clutch 156 is installed onto shaft 150 such that it rotates freely about shaft 150 when member 134 is being recoiled and engages shaft 150 when member 134 is being unwound from shaft 150. Rotor 158 and stator 160 otherwise each function in an identical manner to rotor 76 and stator 78, respectively, in FIG. 2 and FIG. 3.

Figure 12:
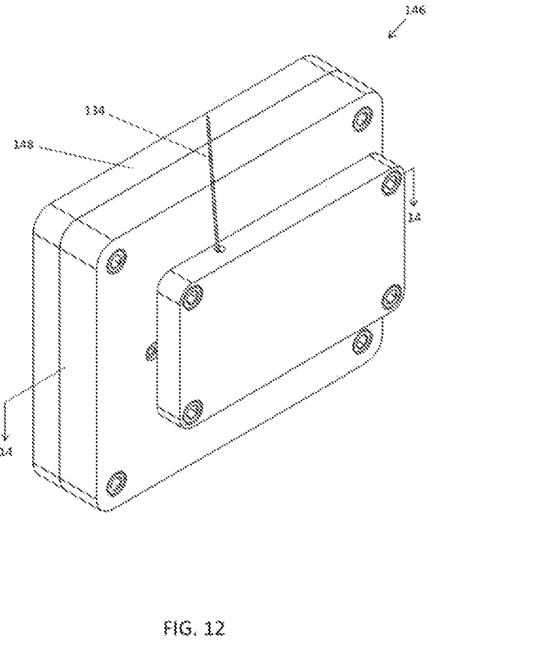
FIG. 12 is a perspective view of a conversion unit.
Figure 13:
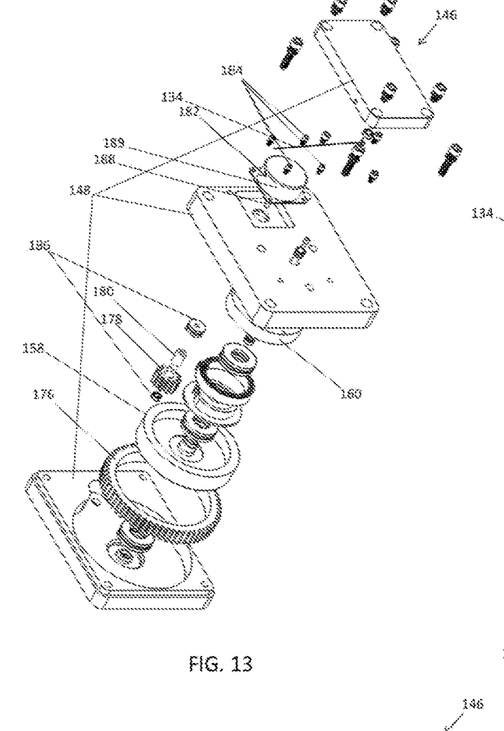
FIG. 13 is an exploded view of a conversion unit.
Figure 14:
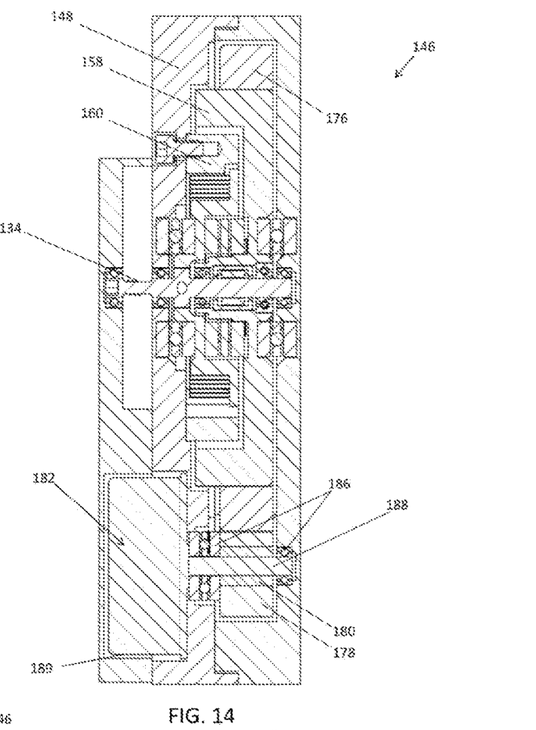
FIG. 14 is a cross section view of a conversion unit.

FIG. 12, FIG. 13, and FIG. 14—An Embodiment of a Conversion Unit

In one embodiment, shown in FIG. 12, FIG. 13, and FIG. 14, unit 146 further comprises a gear 176, a small gear 178, a shaft adapter 180, an electric generator 182, fasteners 184 (FIG. 13), and bearings 186. In this embodiment, rotor 158 and stator 160 are not electromagnetically coupled like rotor 76 and stator 78 from FIG. 2 and FIG. 3. Instead, electric generator 182 functions in the same manner electrically as generator 80 in FIG. 2 and FIG. 3 (e.g. it is connected to cable 46 (FIG. 1)). Fasteners 184 rigidly couple generator 182 to housing 148. Generator 182 includes a shaft 188 and an external rotor 189. Shaft 188 is rigidly coupled to rotor 189. Bearings 186 rotatably couple shaft 188 of generator 182 to housing 148. Adapter 180 is rigidly coupled to gear 178 and to shaft 188 of generator 182 to accommodate a standard size gear and generator.

Gear 176 is rigidly coupled to rotor 158 and is in mesh with gear 178 in order to increase the rotational speed of gear 178 with respect to gear 176. In other embodiments, other suitable speed increasing mechanisms (e.g. a planetary gear set, a compound planetary gear set, a belt drive, a chain drive, a compound gear set, a harmonic drive gear set, and the like) are employed.

Figure 15:
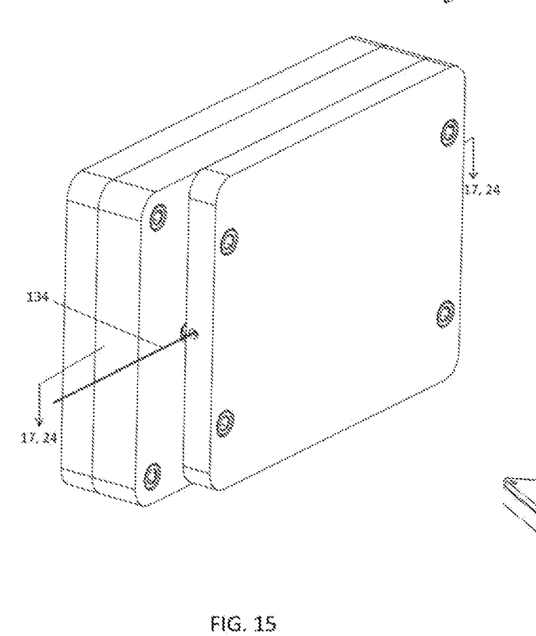
FIG. 15 is a perspective view of a conversion unit.
Figure 16:
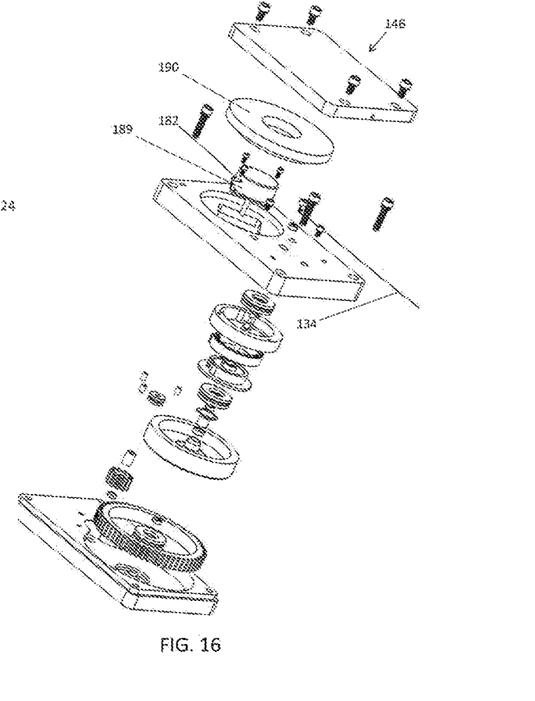
FIG. 16 is an exploded view of a conversion unit.
Figure 17:
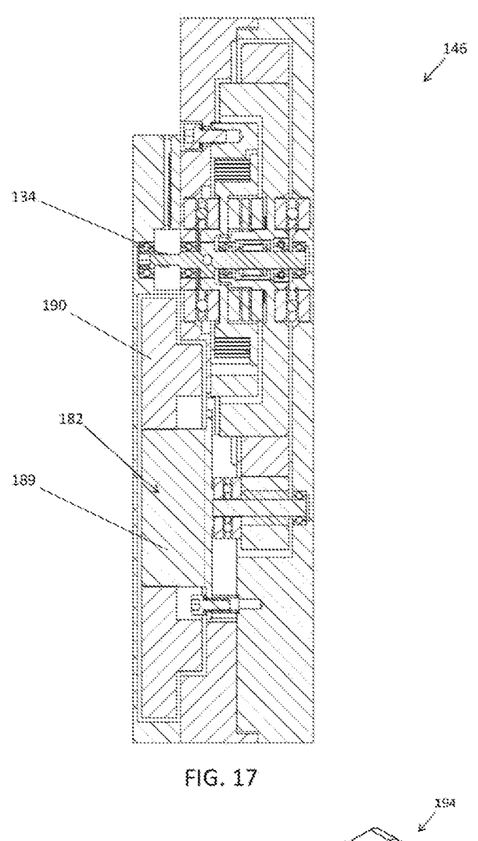
FIG. 17 is a cross section view of a conversion unit.

FIG. 15, FIG. 16, and FIG. 17—An Embodiment of a Conversion Unit

In one embodiment, shown in FIG. 15, FIG. 16, and FIG. 17, unit 146 further comprises a flywheel 190 which is rigidly coupled to rotor 189 of generator 182 to increase the inertia of rotor 189.

Figure 18:
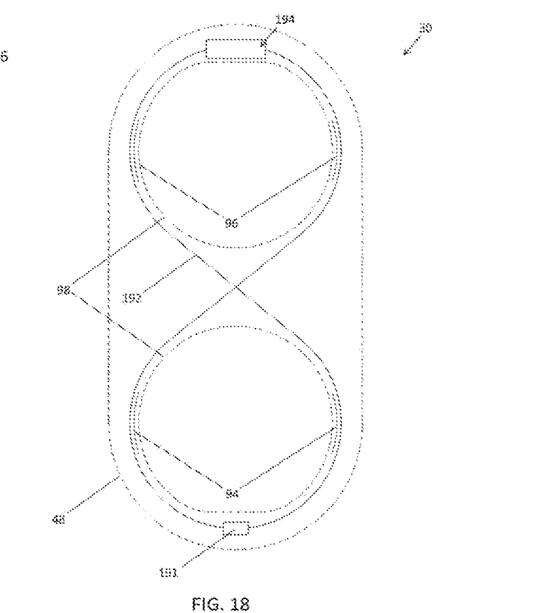
FIG. 18 is a cross section diagram of a biomechanical electric generator.

FIG. 18—An Embodiment of a Biomechanical Electric Generator

In one embodiment, shown in FIG. 18, generator 30 comprises an attachment clamp 191, a flexible tension member 192, a conversion unit 194, cable 46 (FIG. 1), and leg cuffs 94 and 96. User legs 98 and legwear 48 are shown for demonstrational purposes.

In one embodiment, member 192 is affixed to legwear 48 using clamp 191. In another embodiment, member 192 is affixed to a u-shaped leg cuff (not shown) using clamp 191. In one embodiment, clamp 191 is near the sideseam of a first leg 98 that is opposite unit 194. Unit 194 is affixed to legwear 48 near the sideseam of a second leg 98 that is opposite clamp 191. Member 192 is routed around leg cuffs 94 and 96 and into unit 194 in a figure-eight path around legs 98. In one embodiment, member 192 is covered near leg cuffs 94 and 96 to reduce friction and protect the user. In one embodiment, leg cuffs 94 and 96 are affixed to legwear 48 outside of the plane of the cross section in FIG. 18. In one embodiment, leg cuffs extend further circumferentially about legs 98 than those shown in FIG. 18.

In one embodiment, member 192 is a fluorocarbon line. In other embodiments, member 192 is another suitably strong and durable flexible tensile member such as a steel cable, a coated steel cable, a monofilament line, a fluorocarbon line, a nylon rope, and the like. In one embodiment, member 192 is a push-pull cable that can act in tension and compression.

Figure 19:
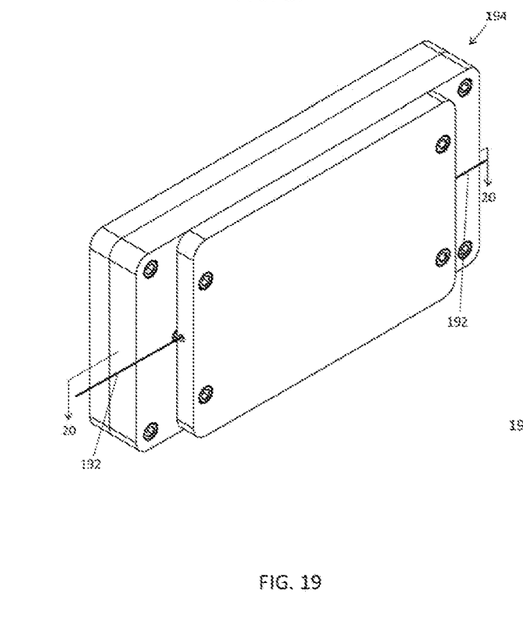
FIG. 19 is a perspective view of a conversion unit.
Figure 20:
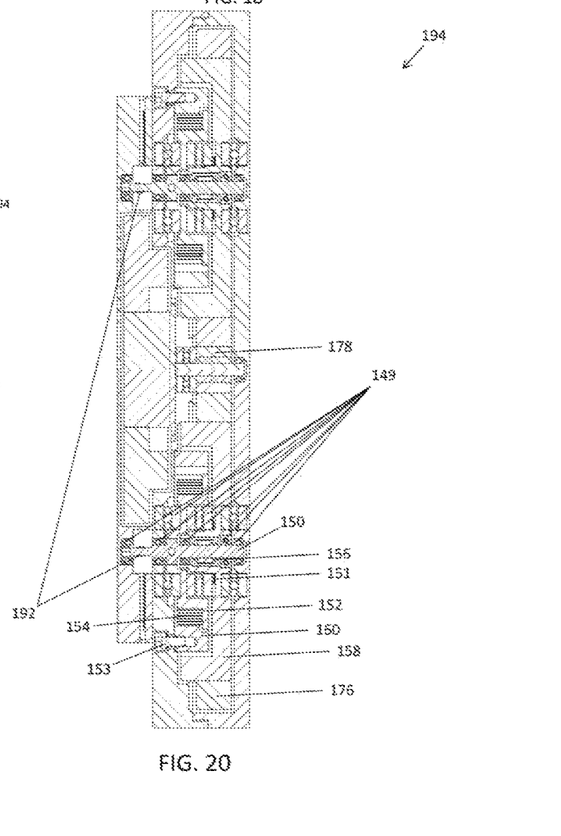
FIG. 20 is a cross section view of a conversion unit.
Figure 21:
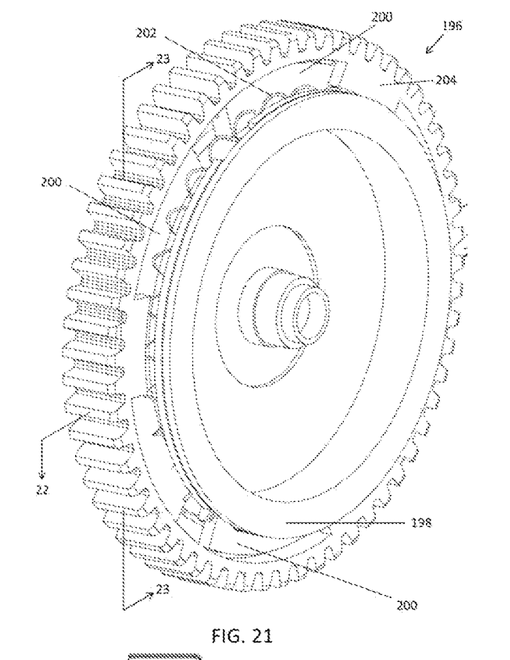
FIG. 21 is a perspective view of a clutch gear.
Figure 22:
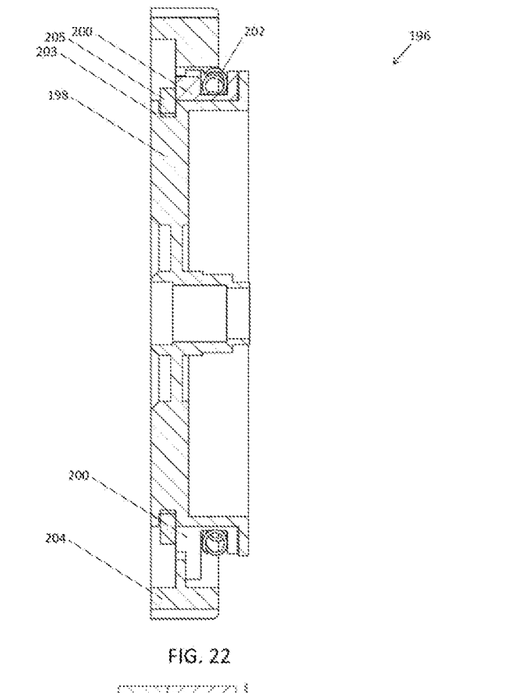
FIG. 22 is a cross section view of a clutch gear.
Figure 23:
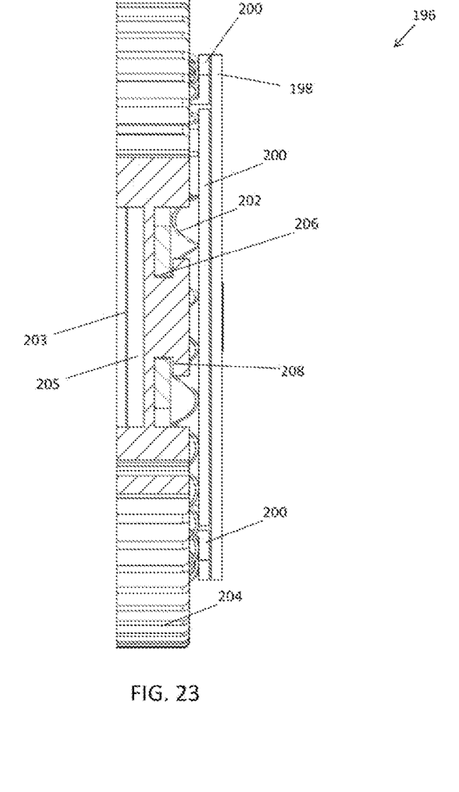
FIG. 23 is a cross section view of a clutch gear.
Figure 24:
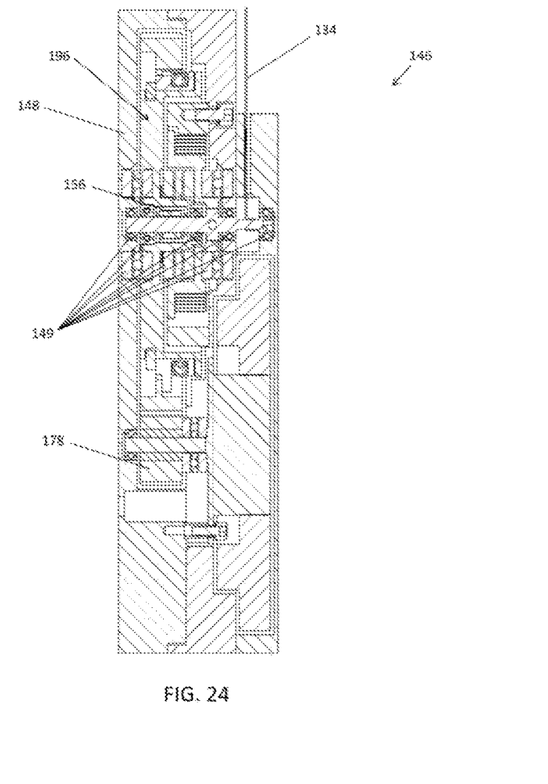
FIG. 24 is a cross section view of a conversion unit.

FIG. 19 and FIG. 20—An Embodiment of a Conversion Unit

In one embodiment, shown in FIG. 19 and FIG. 20, unit 194 includes all of the features of unit 146 shown in FIG. 15, FIG. 16, and FIG. 17, and further includes a second identical set of bearings 149, shaft 150, wave spring 151, recoil disc 152, fasteners 153, recoil spring 154, one way locking clutch 156, rotor 158, stator 160, and gear 176. This second identical set of features functions identically to those in FIG. 15, FIG. 16, and FIG. 17, where each end of member 192 enter unit 146 and act on each set of identical features in the same manner that member 134 acts on the single set of these features in FIG. 15, FIG. 16, and FIG. 17. It should be understood that both ends of member 192 act on their respective set of identical features such that they each drive their respective rotors 158 in the same rotational direction, such that small gear 178 is driven in the same direction by both sets of features.

FIG. 21, FIG. 22, FIG. 23, and FIG. 24—An Embodiment of a Conversion Unit In one embodiment, shown in FIG. 21, FIG. 22, FIG. 23, and FIG. 24, unit 146 is identical to unit 146 of FIG. 15, FIG. 16, and FIG. 17, except that rotor 158 and gear 178 are replaced with a normally engaged centrifugal clutch gear 196.

In one embodiment, clutch gear 196 comprises a rotor 198, a plurality of normally engaged friction shoes 200, a clutch spring 202, a shoe guide gear 204, and a retaining ring 205. Rotor 198 is rigidly coupled to one way locking clutch 156 (FIG. 24) and rotatably mounted to housing 148 via bearings 149 just as rotor 158 is in FIG. 15, FIG. 16, and FIG. 17. Shoe guide gear 204 is rotatably mounted to housing 148 and meshes with gear 178 just as gear 176 did in FIG. 15, FIG. 16, and FIG. 17. Friction shoes 200 are compressed against the periphery of rotor 198 by spring 202. Cutouts 206 (FIG. 23) in shoes 200 slidably mate with undercuts 208 in shoe guide gear 204 such that shoes 200 are able to slide radially outward and disengage rotor 198 when the outward centrifugal force of friction shoes 200 exceeds the inward spring force exerted by spring 202 (e.g. when the rotational speed of rotor 198 exceeds a suitable amount). Retaining ring 205 sits in a groove 203 in rotor 198 to suitably limit the axial motion of the components of clutch gear 196 with respect to rotor 198. Therefore, clutch gear 196 prevents excessive rotational velocity from being transferred from one way locking clutch 156 to gear 178. In other embodiments, clutch gear 196 is another type of centrifugal clutch (e.g. a sprag type centrifugal clutch, and the like).

Figure 25:
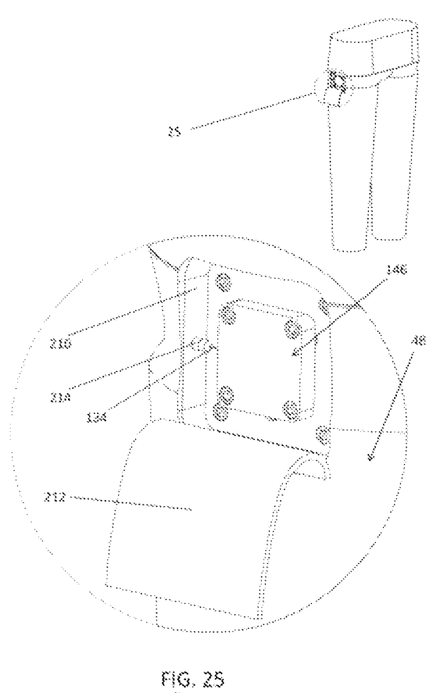
FIG. 25 is a detail view of a biomechanical electric generator

FIG. 25—An Embodiment of a Biomechanical Electric Generator

In one embodiment, shown in FIG. 25, unit 146 sits in a pocket 210 in legwear 48. Legwear 48 includes a flap 212 that is removably mounted to legwear 48 around a portion of its periphery and affixed to legwear 48 around a different portion of its periphery such that the user may easily access unit 146. In one embodiment, flap 212 is removably mounted to legwear 48 using a zipper (not shown). In other embodiments, flap 212 is mounted using another suitable temporary attachment method (e.g. hook and loop fasteners, one or more buttons, one or more fabric snaps, magnets, and the like).

In one embodiment, member 134 includes an in-line detachment mechanism 214 such that the user can easily remove unit 134 from legwear 48. In one embodiment, mechanism 214 includes two cylindrical magnets which hold member 134 together during normal operation, but are also easily detachable. In other embodiments, mechanism 214 is another type of removable fastener (e.g. mating threaded fasteners, interlocking fasteners, mating snap in fasteners, a quick disconnect coupler, and the like).

Figure 26:
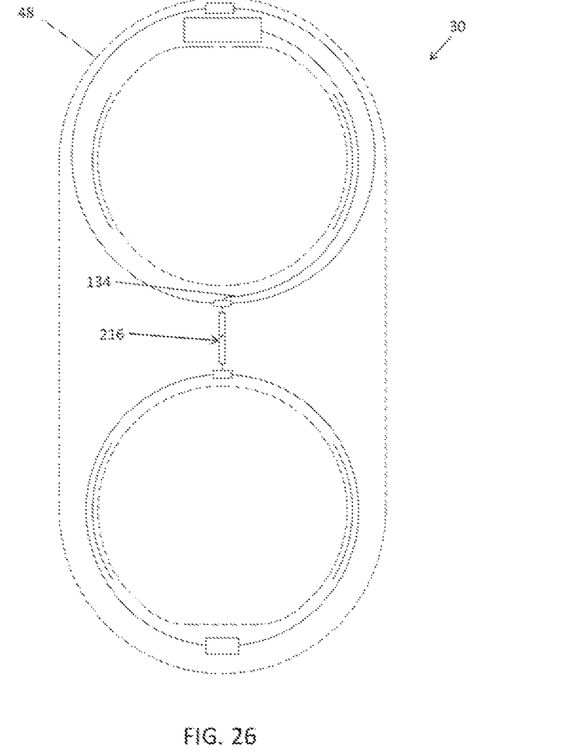
FIG. 26 is a cross section diagram of a biomechanical electric generator.
Figure 27:
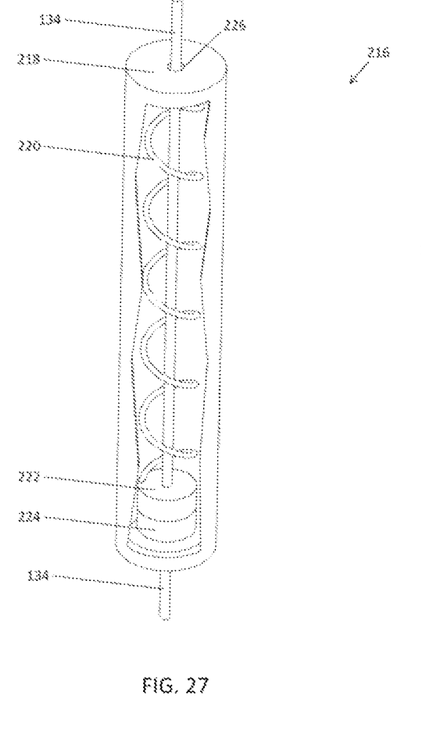
FIG. 27 is a cut away view of an auto-resetting mechanical circuit breaker.

FIG. 26 and FIG. 27—An Embodiment of a Biomechanical Electric Generator

In one embodiment, shown in FIG. 26 and FIG. 27, generator 30 of FIG. 8 further includes an auto-resetting mechanical circuit breaker 216 which is in-line with member 134. Breaker 216 includes a hollow cylindrical breaker housing 218 (FIG. 27), a compression spring 220, a magnet 222, and a magnet 224. A portion of housing 218 has been removed in FIG. 27 to reveal the internal components of breaker 216. Magnets 222 and 224 are oriented such that they are attracted to one another. One end of the break in member 134 is rigidly coupled to magnet 222, and the other end of the break in member 134 is rigidly coupled to magnet 224. When the force exerted on member 134 exceeds a suitable amount, magnets 222 and 224 release, thus preventing any excessive force from being transmitted to generator 30. Spring 220 then mates magnets 222 and 224 once slack is returned to member 134, thereby automatically resetting breaker 216. Housing 218 includes two opposing base holes 226 which allow member 134 to pass though breaker 216 freely but prevent magnets 222 and 224 from exiting housing 218. In one embodiment, magnets 222 and 224 are coated in rubber to prevent damage to magnets 222 and 224 during the resetting process.

In one embodiment, magnet 224 is rigidly coupled to one end of housing 218 and magnet 222 acts as a sealed piston. In this embodiment, housing 218 further includes a one-way valve (not shown) which lets air into housing 218 freely but restricts the flow of air out of housing 218, thereby causing a damping force as magnet 222 releases from magnet 224. In other embodiments, this damping force is provided by another means (e.g. viscous oil, viscoelastic foam, and the like).

It should be understood that breaker 216 may be employed in any embodiment of generator 30 that includes a flexible tensile member.

In some embodiments, generator 30 is hidden within legwear 48 in order to make generator 30 less noticeable to the user.

Figure 28:
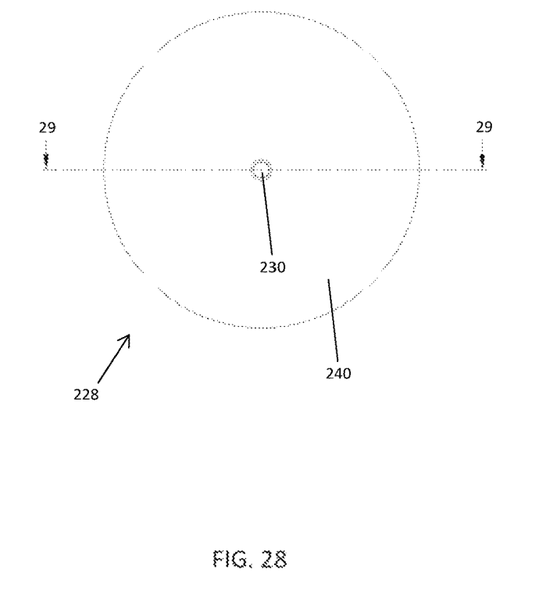
FIG. 28 is a font view of an electric generator.
Figure 29:
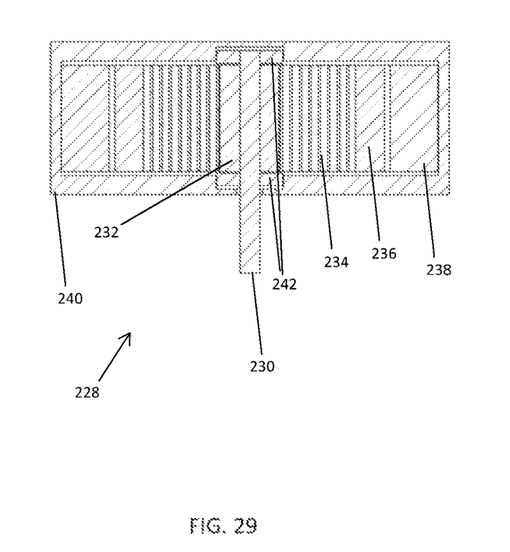
FIG. 29 is a cross section view of an electric generator.

FIG. 28 and FIG. 29—An Embodiment of an Electric Generator

In one embodiment, electric generator 182 of conversion unit 146 of generator 30 is replaced with an electric generator 228. Generator 228 comprises a shaft 230, an inner spring catch 232, a coil spring 234, a rotor 236, a stator 238, a housing 240, and one way locking clutches 242.

Shaft 230 is one-way rotatably mounted to housing 240 through the use of clutches 242. Shaft 230 is rigidly coupled to catch 232 which is, in turn, rigidly coupled to the inner end of spring 234. The outer end of spring 234 is rigidly coupled to the inner surface of rotor 236 which is, in turn, rotatably mounted to housing 240. Stator 238 is rigidly coupled to housing 240. Rotor 236 and stator 238 are electromagnetically coupled and convert the mechanical energy provided by rotor 236 into electrical energy in the coils (not shown) of stator 238, thereby comprising an electric generator 228.

In one embodiment, rotor 158 (FIG. 14) of conversion unit 146 does not have significant inertia and instead spring 234 is designed to be long enough and have a high enough energy storage capacity such that it can maintain a suitable rotational speed of rotor 238 for efficient electrical conversion during in between steps of a user (not shown) during normal operation. In another embodiment, the energy storage capacity of spring 234 supplements the energy storage capacity of a high inertia rotor 158.

Clutches 242 prevent stored energy in spring 234 from being fed back into conversion unit 146.

Figure 30:
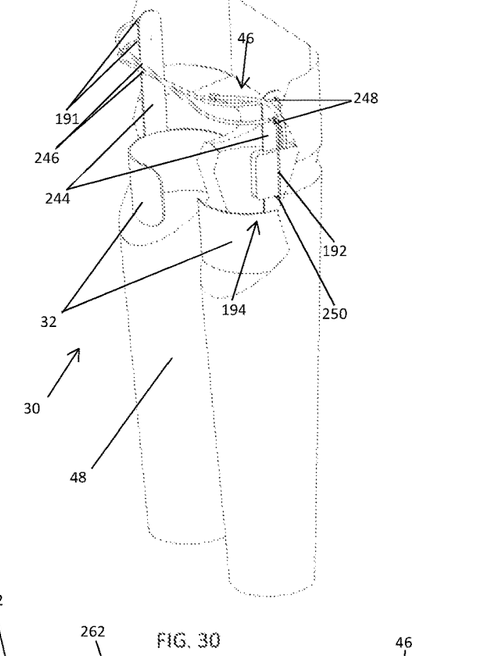
FIG. 30 is a perspective cut-away view of a biomechanical electric generator.

FIG. 30—An Embodiment of a Biomechanical Electric Generator

In one embodiment, shown in FIG. 30, biomechanical electric generator 30 comprises leg cuffs 32, crank arms 244, attachment clamps 191, flexible tension member 192, tension member sleeves 246, tension member guides 248, lower tension member guide 250, conversion unit 194, and electric cable 46. Legwear 48 is shown in FIG. 30 with a portion removed to reveal generator 30 for demonstrational purposes.

Crank arms 244 are attached to and extend upward from the upper lateral surface of leg cuffs 32 to transmit the user's legs' motion to member 192 using attachment clamps 191 and guides 248. Guides 248, guide 250, and unit 194 are rigidly attached to one of the crank arms 244 and attachment clamps 191 are attached to the other crank arm 244. Attachment clamps 191 and guides 248 are aligned substantially vertically and placed a suitable distance apart such that one of the attachment clamps 191 and one of the guides 248 travel a suitable horizontal distance with respect to the other attachment clamp 191 and guide 248, respectively, during normal operation. Guides 248 route each end of member 192 into unit 194. Member 192 is routed out of the bottom of unit 194 through guide 250, through the lower guide 248, attached at the upper clamp 191, attached at the lower clamp 191, through the upper guide 248, and into the top of unit 194. Sleeves 246 help to reduce friction between the user and member 192.

In one embodiment, conversion unit 92 is used instead of conversion unit 194.

In one embodiment (not shown), member 192 is routed out of the bottom of unit 194 through guide 250, through an only guide 248 located substantially along the axis of rotation of the user's upper leg while walking, attached at the upper clamp 191 above the axis, attached at the lower clamp 191 below the axis, and attached to itself at a point a suitably small distance before reaching guide 248 again, such that conversion unit 146 may be used in place of conversion unit 194.

Figure 31:
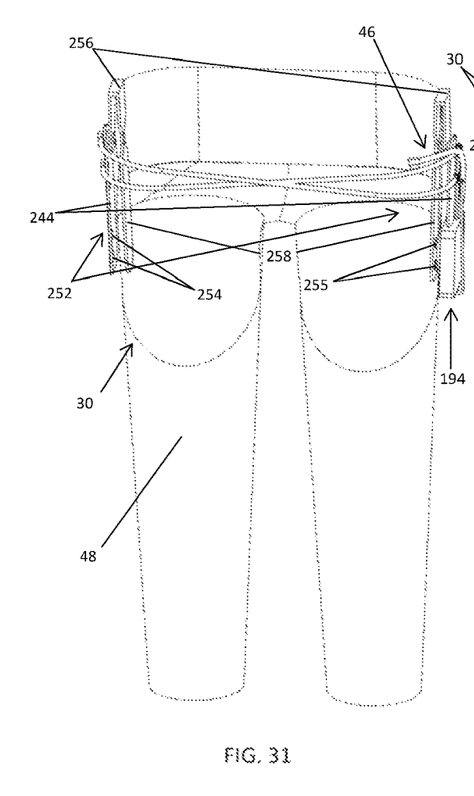
FIG. 31 is a perspective cut-away view of a biomechanical electric generator.

FIG. 31—An Embodiment of a Biomechanical Electric Generator

In one embodiment, shown in FIG. 31, biomechanical electric generator 30 comprises all of the same components as generator 30 in FIG. 30 except for leg cuffs 32, which have been replaced with legwear clamps 252. Legwear 48 is shown in FIG. 30 with a portion removed to reveal generator 30 for demonstrational purposes.

Clamps 252 act similarly to leg cuffs 32; they transmit the motion of the user's legs to crank arms 244. Instead of directly contacting the user's legs as leg cuffs 32 do, clamps 252 clamp onto and transmit the motion of legwear 48 which are, in turn, are contacting and transmitting the motion of the user's legs.

In one embodiment, clamps 252 each comprise one or more magnets 254, magnets 255, a waistband cover 256, and an inner clamping arm 258. Covers 256 are U-shaped with their concave sides facing down to cover part of the sides of a waistband of legwear 48. Crank arms 244 are rotatably attached near their upper ends to covers 256 outside of legwear 48. Clamping arms 258 are rotatably attached near their upper ends to covers 256 inside of legwear 48.

Magnets 254 are affixed to the lower portions of the inner surfaces of crank arms 244. Magnets 255 are affixed to the lower portions of the outer surfaces of clamping arms 258. For each magnet 254, there is a corresponding magnet 255 which is substantially axially aligned with it. The magnets 254 and 255 are of sufficient strength and oriented such that each magnet 254 and its corresponding magnet 255 attract one another and thusly grip with sufficient force onto legwear 48. In one embodiment, magnets 254 and magnets 255 are rubberized magnets to help increase the friction force between magnets 254 and 255 and legwear 48. In other embodiments, sliding spring clips (not shown) such as those which secure pants to a pants hanger are used in place of magnets 254 and magnets 255 to provide a sufficient clamping force.

The rotatable mounting of crank arms 244 and clamping arms 258 to covers 256 should be such that the axes of rotation substantially align with the axes of rotation of the user's upper legs while walking. This hinged arrangement also allows crank arms 244 and clamping arms 258 to extend further down the user's legs to better transmit the legs' motion while remaining relatively comfortable, especially while the user is sitting.

Figure 32:
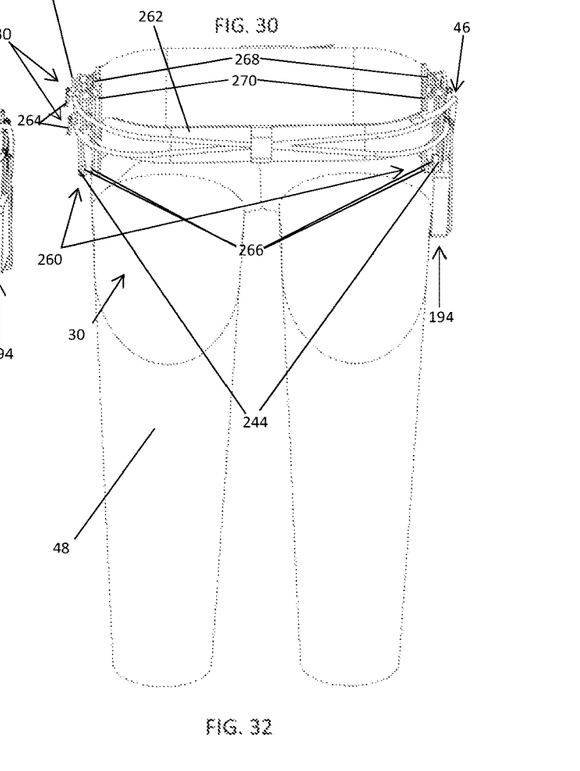
FIG. 32 is a perspective cut-away view of a biomechanical electric generator.

FIG. 32—An Embodiment of a Biomechanical Electric Generator

In one embodiment, shown in FIG. 32, biomechanical electric generator 30 comprises all of the same components as generator 30 in FIG. 31 except for legwear clamps 252, which have been replaced with legwear clamps 260. In FIG. 32, generator 30 further comprises a belt 262 and clamps 191 further comprise toggle levers 264 to allow for ease of adjustment of the locations where clamps 191 attach to member 192. In one embodiment, toggle levers 264 are linked together with a coupler link (not shown) to allow both clamps 191 to be secured in a single action. Legwear 48 is shown in FIG. 30 with a portion removed to reveal generator 30 for demonstrational purposes.

In one embodiment, each of the legwear clamps 260 comprises rubber pads 266, a leaf spring 268, and an inner clamping arm 270. For each legwear clamp 260, the rubber pads 266 are attached near the lower end of crank arm 244 on the inner surface and to clamping arm 270 near the lower end on the outer surface (the surface that faces away from the user). Rubber pads 266 therefore add friction to help clamps 260 grip legwear 48. In other embodiments, pads 266 are replaced with another suitable fabric gripping device such as fabric gripping teeth, fabric snaps, hook and loop fasteners, and the like.

Clamping arms 270 are rotatably attached to crank arms 244 near their upper end. Spring 268 pushes the upper portions (above the axis created by rotation of arms 270 with respect to arms 244) of crank arms 244 and clamping arms 270 apart thereby creating the desired clamping force. Crank arms 244 are rotatably attached to belt 262 such that all of the components of generator 30 may be aligned with belt 262 to allow generator 30 to be inserted and removed from legwear 48 through the belt loops (not shown) of legwear 48. In one embodiment, member 192 is concealed within belt 262.

Operation

FIG. 1, FIG. 2, and FIG. 3—An Embodiment of a Biomechanical Electric Generator In one embodiment, shown in FIG. 1, FIG. 2, and FIG. 3, the user puts their legs through leg cuffs 32, expanding them gently so that they fit snugly to the user's legs. In one embodiment, leg cuffs 32 fit loosely and include adjustable straps (not shown) which allow the user to tighten leg cuffs 32 to their liking. The user then attaches cable 46 to their electronic device. In one embodiment, connector 86 is magnetic and is affixed to the base of a pocket in legwear 48, and a mating magnetic connector (not shown) is inserted into the charging port on their electronic device. In this embodiment, the user simply slides their electronic device into their pocket, where connector 86 automatically comes into electrical connection with their device. In one embodiment, connector 86 is a female connector, thus the user would attach a first end of a charging cable to connector 86 and the second end of their charging cable to their device. In one embodiment, connector 86 is routed to just above a pocket in legwear 48, so the user would insert their device into the pocket and attach connector 86 to their device.

The user would then begin forward locomotion. The relative motion of crank arms 34 then causes shaft 40, shaft 42, and input shaft 51 in unit 44 to undergo oscillatory rotation. This oscillating rotational motion is then converted into an intermittent one way rotation of shaft 60 by virtue of input bevel gear 50, bevel gear 52, bevel gear 54, one way locking clutch 56, and one way locking clutch 58. The angular speed of this intermittent one way rotation is then increased at shaft 72 by virtue of pulley 62, belt 63, pulley 64, shaft 66, pulley 68, belt 69, and pulley 70. The direction of rotation causes clutch 74 to engage shaft 72 which, in turn, causes rotor 76 to rotate at a substantially constant speed so long as the user continues locomotion. Consequently, generator 80 and circuit 84 provide a substantially stable DC voltage to charge the user's device.

In one embodiment, shaft 40 is rotatably mounted to leg cuffs 32 and no crank arms exist, therefore in this case the oscillatory rotation is caused by the relative motion of leg cuffs 32.

FIG. 4 and FIG. 5—An Embodiment of a Biomechanical Electric Generator

In one embodiment, shown in FIG. 4 and FIG. 5, the user puts their legs through leg cuffs 94 and 96, expanding them gently so that they fit snugly to the user's legs. In one embodiment, leg cuffs 94 and 96 fit loosely and include adjustable straps (not shown) which allow the user to tighten leg cuffs 94 and 96 to their liking. The user then attaches cable 46 to their electronic device.

The user would then begin forward locomotion. The relative motion of leg cuffs 94 and 96 then causes member 90 to move back and forth through unit 92. Similarly to the embodiment of unit 44 shown in FIG. 2 and FIG. 3, unit 92 converts this back and forth motion of member 90 into substantially stable DC voltage to charge the user's device through cable 46.

FIG. 8—An Embodiment of a Biomechanical Electric Generator

In one embodiment, shown in FIG. 8, the user puts their legs through leg cuffs 94 and 96, expanding them gently so that they fit snugly to the user's legs. In one embodiment, leg cuffs 94 and 96 fit loosely and include adjustable straps (not shown) which allow the user to tighten leg cuffs 94 and 96 to their liking. The user then attaches cable 46 to their electronic device.

The user would then begin forward locomotion. The relative motion of leg cuffs 94 and 96 along with the recoiling action of unit 146 then causes member 134 to move into and out of unit 146 with each step. Similarly to the embodiment of unit 44 shown in FIG. 2 and FIG. 3, unit 146 converts this reciprocating motion of member 134 into substantially stable DC voltage to charge the user's device through cable 46.

FIG. 18—An Embodiment of a Biomechanical Electric Generator

In one embodiment, shown in FIG. 18, the user puts their legs through leg cuffs 94 and 96, expanding them gently so that they fit snugly to the user's legs. In one embodiment, leg cuffs 94 and 96 fit loosely and include adjustable straps (not shown) which allow the user to tighten leg cuffs 94 and 96 to their liking. The user then attaches cable 46 to their electronic device.

The user would then begin forward locomotion. The relative motion of leg cuffs 94 and 96 along with the recoiling action of unit 194 then causes each end member 192 to move into and out of unit 194 every two steps. Similarly to the embodiment of unit 44 shown in FIG. 2 and FIG. 3, unit 194 converts this reciprocating motion at each end of member 192 into substantially stable DC voltage to charge the user's device through cable 46.

FIG. 25—An Embodiment of a Biomechanical Electric Generator

In one embodiment, shown in FIG. 25, the user would be able to easily insert or remove unit 146 from legwear 48.

FIG. 30—An Embodiment of a Biomechanical Electric Generator

In one embodiment, shown in FIG. 30, the user puts their legs through leg cuffs 32, expanding them gently so that they fit snugly to the user's legs. The user then attaches cable 46 to their electronic device. The user would then begin forward locomotion. The relative motion of leg cuffs 32 along with the recoiling action of unit 194 then causes each end of member 192 to move into and out of unit 194 every two steps. Similarly to the embodiment of unit 44 shown in FIG. 2 and FIG. 3, unit 194 converts this reciprocating motion at each end of member 192 into substantially stable DC voltage to charge the user's device through cable 46.

FIG. 31—An Embodiment of a Biomechanical Electric Generator

In one embodiment, shown in FIG. 31, the user slides legwear clamps 252 over the sides of their waistband of their legwear 48 until the waistband reaches waistband covers 256. The user then attaches cable 46 to their electronic device. The user would then begin forward locomotion. The relative motion of crank arms 244 along with the recoiling action of unit 194 then causes each end of member 192 to move into and out of unit 194 every two steps. Similarly to the embodiment of unit 44 shown in FIG. 2 and FIG. 3, unit 194 converts this reciprocating motion at each end of member 192 into substantially stable DC voltage to charge the user's device through cable 46.

FIG. 32—An Embodiment of a Biomechanical Electric Generator

In one embodiment, shown in FIG. 32, the user uses belt 262 to guide generator 30 through the belt loops of their legwear 48 and buckles belt 262. The user then pinches the upper portion of legwear clamps 260 and slides them over the sides of their waistband of their legwear 48 by rotating clamps 260 with respect to belt 262 until clamps 260 are substantially perpendicular to belt 262. The user then attaches cable 46 to their electronic device. The user would then begin forward locomotion. The relative motion of crank arms 244 along with the recoiling action of unit 194 then causes each end of member 192 to move into and out of unit 194 every two steps. Similarly to the embodiment of unit 44 shown in FIG. 2 and FIG. 3, unit 194 converts this recip-rocating motion at each end of member 192 into substantially stable DC voltage to charge the user's device through cable 46.

I claim:

1. A biomechanical electric generator, comprising: a conversion unit which is removably attached to a first upper leg of a user; and a transmission component which is removably attached to a second upper leg of the user at a first end and a second end of the transmission component is coupled to the conversion unit, the transmission component transmits relative motion between the first and second leg during locomotion to the conversion unit; wherein the conversion unit converts the motion of the transmission component into electrical power wherein the transmission component further comprises a flexible tension member which is positioned around the first upper leg of the user and the second upper leg of the user in a figure eight path, the flexible tension member is removably attached to a portion of the second upper leg of the user at the first end and coupled to the conversion unit at the second end wherein a first portion of the flexible tension member, which is routed behind the first upper leg of the user and in front of the second upper leg of the user, is drawn out of the conversion unit when the user moves the second leg forward relative to the first upper leg, and a second portion of the flexible tension member, which is routed behind the second upper leg of the user and in front of the first upper leg of the user, is drawn out of the conversion unit when the user moves the first leg forward relative to the second leg.

2. A biomechanical electric generator, comprising: a conversion unit which is removably attached to a first upper leg of a user; and a transmission component which is removably attached to a second upper leg of the user at a first end and a second end of the transmission component is coupled to the conversion unit, the transmission component transmits relative motion between the first and second leg during locomotion to the conversion unit; wherein the conversion unit converts the motion of the transmission component into electrical power wherein the transmission component further comprising a flexible tension member which is positioned around the user, the flexible tension member is removably attached to a portion of the second upper leg of the user at an upper attachment point and at a lower attachment point at the first end, routed slidably on the first leg of the user between an upper routing point and a lower routing point, and coupled to the conversion unit at the second end such that a first portion of the flexible tension member, which is attached at the upper attachment point and routed through the lower routing point, is drawn out of the conversion unit when the user moves the first leg forward relative to the second leg, and such that a second portion of the flexible tension member, which is attached at the lower attachment point and routed through the upper routing point, is drawn out of the conversion unit when the user moves the second leg forward relative to the first leg.

3. A biomechanical electric generator, comprising: a conversion unit which is removably attached to a first upper leg of a user; a transmission component which is removably attached to a second upper leg of the user at a first end and a second end of the transmission component is coupled to the conversion unit, the transmission component transmits relative motion between the first and second leg during locomotion to the conversion unit; and legwear clamps which transmit motion of legwear of a user to the transmission component, thereby transmitting the motion of the user's upper legs to the transmission component, the legwear clamps rotatably attached to the generator near an upper portion of the upper leg such that, when the generator is not being used to generate electric power, the legwear clamps can rotate substantially 90 degrees to allow the generator to be removed through a plurality of belt loops on the legwear of the user wherein the conversion unit converts the motion of the transmission component into electrical power.

4. A method for converting motion of a user's legs into electrical power, comprising:
   removably attaching a conversion unit to a first upper leg of the user;
   removably attaching a flexible tension member to a second upper leg of a user at a first end; and
   coupling a second end of the flexible tension member to the conversion unit such that the flexible tension member transmits relative motion between the first and second leg during locomotion to the conversion unit;
   wherein the conversion unit converts the motion of the flexible tension member into electrical power and wherein the flexible tension member is positioned around the first upper leg of the user and the second upper leg of the user in a figure eight path and wherein a first portion of the flexible tension member, which is routed behind the first upper leg of the user and in front of the second upper leg of the user, is drawn out of the conversion unit when the user moves the second leg forward relative to the first upper leg, and a second portion of the flexible tension member, which is routed behind the second upper leg of the user and in front of the first upper leg of the user, is drawn out of the conversion unit when the user moves the first leg forward relative to the second leg.

5. A biomechanical electric generator, comprising: a conversion unit which is removably attached to a first upper leg of a user; and a transmission component which is removably attached to a second upper leg of the user at a first end and a second end of the transmission component is coupled to the conversion unit, the transmission component transmits relative motion between the first and second leg during locomotion to the conversion unit; wherein the conversion unit converts the motion of the transmission component into electrical power wherein the transmission component further comprising a flexible tension member which is removably attached to an inner portion of the second leg of the user at a first end of the tension member, the tension member is slidably routed through a ring which is removably attached to an inner portion of the first leg of the user, the tension member is coupled to the conversion unit such that when the user starts with a first position with the first and second legs substantially aligned and moves to a second position with the first leg forward relative to the second leg, the flexible tension member is drawn out of the conversion unit, wherein when the user starts with a third position with the first and second legs substantially aligned and moves to a fourth position with the second leg forward relative to the first leg, the flexible tension member is drawn out of the conversion unit.

* * * * *